United States Patent
Kori et al.

(10) Patent No.: US 6,480,607 B1
(45) Date of Patent: Nov. 12, 2002

(54) ENCRYPTED DATA REPRODUCING TRANSMITTING AND PROCESSING METHOD AND APPARATUS WITH SEPARATELY ENCRYPTED CONTROL DATA

(75) Inventors: Teruhiko Kori, Kanagawa (JP); Tadashi Ezaki, Tokyo (JP); Akira Ogino, Tokyo (JP); Yuji Kimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/207,292

(22) Filed: Dec. 8, 1998

(30) Foreign Application Priority Data

Dec. 10, 1997  (JP) ............................................... 9-340251

(51) Int. Cl.$^7$ ........................... H04N 7/167; H04L 9/32; H04K 1/10
(52) U.S. Cl. ...................... 380/201; 380/203; 713/165; 713/173; 705/51; 705/57
(58) Field of Search ......................... 70/165, 194, 176; 380/201–204, 210, 236, 237, 239, 240, 241, 242; 705/51, 57, 58; 713/165, 176, 194

(56) References Cited

U.S. PATENT DOCUMENTS 6,002,772 A * 12/1999 Saito ............................ 380/49
6,061,451 A * 5/2000 Muratani et al. ........... 380/201

* cited by examiner

Primary Examiner—Justin T. Darrow
(74) Attorney, Agent, or Firm—Frommer Lawrence & Haug LLP; William S. Frommer; Gordon Kessler

(57) ABSTRACT

A data reproducing apparatus high in security against unauthorized duplication. A drive 20 includes a first CSS encoder 21 for performing first encryption processing on picture data etc reproduced from an optical disc D and a second CSS encoder 22 for performing second encryption processing different from the first encryption processing on the media type information of the optical disc D. The drive transmits the so-processed data or information. A data processing device 30 performs decryption processing on the transmitted picture data etc and on the media type information by respective independent decoders. The data processing apparatus detects the copyright control information from the picture data etc and performs reproduction limitation or recording limitation on the picture data etc.

54 Claims, 7 Drawing Sheets

ENCRYPTED DATA REPRODUCING TRANSMITTING AND PROCESSING METHOD AND APPARATUS WITH SEPARATELY ENCRYPTED CONTROL DATA

BACKGROUND OF THE INVENTION

1. Field of the Invention

This invention relates to a data reproducing method and apparatus, a data transmitting method, a data transmitting system, and a data processing method and apparatus for protecting the copyright of data recorded on a recording medium or transmitted over a transmission medium, and for safeguarding against unauthorized duplication.

2. Description of the Related Art

Recently, with coming into widespread use of digital contents, such as Internet or digital video discs, infringements of the digital contents by unauthorized duplication of the digital contents, frequently give rise to a problem.

For coping with this problem, there has recently been proposed a method of prohibiting unauthorized copying of picture or music data purveyed in a stored state on a recording medium or using a network as a transmission medium by burying the copyright information in the data by watermark processing.

The watermark processing is the processing of burying the information as a noise in a perceptually non-crucial portions present im the picture or music data, that is in the non-redundant portions with respect to the music or the picture. The copyright information, buried in the picture or music data by such watermark processing, can scarcely be removed, while it can be retrieved even after filtering or data compression.

For overcoming the above problem, it has been proposed to bury the watermark processing in picture data etc or to encrypt data being recorded or transmitted to prohibit unauthorised duplication. By encrypting the recorded or transmitted data, unauthorized duplication cannot be made unless the encrypting algorithm is decoded.

FIG. 1 shows a conventional optical disc reproducing device exploiting the above-mentioned watermark processing and encryption.

The conventional optical disc reproducing device 100, shown in FIG. 1, is applied to, for example, a personal computer.

This optical disc reproducing device 100 includes an optical disc drive 101, a data processing device 102for doing data processing on picture data etc read out from the optical disc drive 101, and a transmission line 103 for interconnecting the optical disc drive 101 and the data processing device 102.

In a data area of an optical disc D is recorded picture data on moving or still pictures or speech data on music or speech. These data are previously compressed in accordance with the MPEG system. On the picture data, the copyright information is superimposed by the above-mentioned watermark processing.

The copyright information, superimposed on the picture data, may be exemplified by the following copyright control information:

That is, there are superimposed on the picture data "copy free", specifying that picture or music data recorded on the recording medium or transmitted can be copied, "one copy", specifying that only one copying operation is possible, "no more copy" specifying that data has been copied from the above "one copy" data, or "never copy" specifying that copying cannot be permitted. The reproducing device or the recording device, which has detected this copyright control information, limits reproduction or recording on the picture or music data.

The compressed picture data or compressed speech data, recorded on this optical disc D, is encrypted by a predetermined encrypting key.

On the optical disc D, there is recorded the media type information of this optical disc D, along with the above-mentioned picture data or audio data. This media type information is the information specifying whether the optical disc is the read-only ROM disc or a recordable RAM disc.

From this optical disc D, the above media type information as well as the compressed picture or audio data is read out by the optical disc drive 101.

The optical disc drive 101 sends the read-out compressed picture data, compressed speech data and the media type information over the transmission line 103 to the data processing device 102. The data transmitted on the transmission line 103 is transmitted after being encrypted by the so-called contents scramble system (CSS).

If the present optical disc reproducing device 100 is applied to, for example, a personal computer, the transmission line 103 is connected by the bus line.

The data processing device 102 includes a CSS decoder 104, an MPEG decoder 105, a media type decoder 106, watermark (WM) detection/re-encoding unit 107, an output controller 108, and switches 111, 112.

The data processing device 102 is enclosed in, for example, a data card etc loaded on a personal computer.

The CSS decoder 104 is fed with the compressed picture or audio data and the media type information, transmitted in the encrypted form, and executes decryption using a predetermined encryption key. If decryption is not made using the correct decryption key, the ensuing processing cannot be effectuated. If decryption is done using the correct encryption key, this CSS decoder 104 sends picture data and audio data to the MPEG decoder 105, while sending the media type information to the media type decoder 106.

The MPEG decoder 105 expands the compressed picture and speech data. The expanded picture data is sent to the watermark (WM) detection/re-encoding unit 107, while the expanded speech data is outputted via switch 111 to outside.

The media type decoder 106 decodes the media type information sent from the CSS decoder 104 to detect the information on whether the optical disc D reproduced by the optical disc drive 101 is a ROM disc or a RAM disc, and sends the detected information to the output controller 108.

The watermark (WM) detection/re-encoding unit 107 detects the copyright control information, superimposed on the picture data by watermark processing. The detected copyright control information is "copy free", "one copy", "no more copy" or "never copy", as described above. The watermark (WM) detection/re-encoding unit 107 sends the detected copyright control information to the output controller 108. If, as a result of detection of the copyright control information, the watermark (WM) detection/re-encoding unit 107 has detected "one copy", it re-encodes the copyright control information superimposed on the picture data by watermark processing to change the copyright control information to "no more copy" and outputs the result to outside via switch 112. If, as a result of detection of the copyright control information, the watermark (WM) detection/re-encoding unit 107 has detected the information other than "one copy", it outputs the detected result to outside via switch 112 without performing the re-encoding.

The output controller 108 performs on/off control of the switch 111 and the switch 112, based on the information sent from the media type decoder 106 and the watermark (WM) detection/re-encoding unit 107. Specifically, if the optical disc D is the ROM disc and the copyright control information is "no more copy", and if the optical disc D is the RAM disc and the copyright control information is "one copy", the output controller 108 assumes that data recorded on the optical disc D has been duplicated illicitly, and accordingly controls the switches 111, 112 to off states.

In the conventional optical disc reproducing device 100, as described above, it is possible to encrypt data transmitted between the optical disc drive 101 and the data processing device 102 to prevent unauthorized duplication and to manage control for halting the reproduction of the illicitly duplicated optical disc D using the copyright control information.

In the above-described conventional optical disc reproducing device 100, the processing of superimposing the copyright control information by watermark processing is performed on base-band picture data prior to MPEG encoding. There are occasions, however, wherein the copyright control information is superposed on an elementary stream prior to MPEG encoding. In such case, the data processing device 102 of the optical disc reproducing device 100 is configured so that the watermark (WM) detection/re-encoding unit 107 detects the copyright control information based on the compressed picture data prior to MPEG decoding and the switch 111 is provided between the CSS decoder 104 and the MPEG decoder 105.

It is feared that an unauthorized reproducing device 202 shown in FIG. 3 is provided in the above-described conventional optical disc reproducing device 100. This unauthorized reproducing device 202 acquires input signals from the transmission line 103 between the optical disc drive 101 and the data processing device 102 to effect decryption by an illicitly prepared CSS decoder 204. An MPEG decoder 205 expands picture data obtained from this illicitly prepared CSS decoder 204 to output video and audio data.

That is, in the conventional optical disc reproducing device 100, picture data, speech data and media type information are transmitted after encryption by a sole algorithm. Thus, unauthorized duplication occurs on decoding this sole algorithm.

In consideration that the unauthorized reproducing device 202 is fabricated by decoding the sole encrypting algorithm, a data transmission system with higher security has been a desideratum.

SUMMARY OF THE INVENTION

It is therefore an object of the present invention to provide a data reproducing method and apparatus, a data transmitting system, a data transmitting method and a data processing method and apparatus having high security against unauthorized duplication of transmitted or recorded data.

In one aspect, the present invention provides a data reproducing apparatus including reproducing means for reproducing data recorded on a recording medium, first encryption means for performing first encryption processing on the data reproduced by the reproducing means, second encryption means for performing second encryption processing different from the first encryption processing on at least control data concerning copyright control processing of the data reproduced by the reproducing means and transmission means for transmitting the data encrypted by the first encryption means and the second encryption means.

This data reproducing apparatus performs different encoding processing on control data.

In another aspect, the present invention provides a data reproducing apparatus including reproducing means for reproducing data recorded on a recording medium;
encryption means for encrypting the data reproduced by the reproducing means and control data relevant at least to copyright control processing of the data, transmission means for transmitting data encrypted by the encrypting means to an external signal processing device, reception means for receiving playback control data transmitted from the external signal processing device, the playback control data being the data transmitted by the transmission means encrypted in a manner different from the encrypting by the encrypting means and processed with copyright control processing, decrypting means for doing decrypting matched to encrypting of the playback control data received by the reception means, and control means for controlling the playback processing of the reproducing means based on the playback control data decrypted by the decrypting means.

This data reproducing apparatus also performs different encoding processing on control data.

In a further aspect, the present invention provides a data processing apparatus including reception means for receiving data processed with first encrypting processing and control data at least relevant to copyright control processing of the data and which is encrypted by second encrypting processing different from the first encrypting processing, the data and the control data being transmitted from an external device, first decrypting means for doing first decrypting processing, matched to the first encrypting processing, on the data received by the reception means, second decrypting means for doing second decrypting processing, matched to the second encrypting processing, on the data received by the reception means, outputting means for outputting data decrypted by the first decrypting means, and control means for doing copyright control processing of the data outputted by the outputting means, based on at least the control data decrypted by the second decrypting means, for controlling outputting processing of the outputting means.

This data processing apparatus performs different encoding processing on control data.

In a further aspect, the present invention provides a data processing apparatus including reception means for receiving data and control data at least relevant to copyright control processing of the data, the data and the control data being encrypted and transmitted in this encrypted form from an external device, decrypting means for performing matched decrypting processing on the data and the control data received by the reception means, outputting means for outputting data decrypted by the decrypting means, control means for doing copyright control processing of the data outputted by the outputting means, based on at least the control data decrypted by the decrypting means, for generating transmission control data controlling transmission processing of the data transmitted from the external device, encrypting means for performing encrypting processing on the transmission control data generated by the control means, the encrypting processing being different from that on the data and control data received by the reception means and transmitting means for transmitting the transmission control data encrypted by the encrypting means to the external device.

This data processing apparatus performs different encoding processing on control data.

In a further aspect, the present invention provides a data transmission system including a data reproducing apparatus and a data processing apparatus, in which data reproduced from a recording medium by the data reproducing apparatus is transmitted to the data processing apparatus, the transmitted data is processed in a predetermined manner by the data processing apparatus and in which the processed data is outputted,. The data reproducing apparatus includes reproducing means for reproducing data recorded on a recording medium, first encryption means for performing first encryption processing on the data reproduced by the reproducing means, second encryption means for performing second encryption processing different from the first encryption processing on at least control data concerning copyright control processing of the data reproduced by the reproducing means, and transmission means for transmitting the data encrypted by the first encryption means and the second encryption means. The data processing apparatus includes reception means for receiving data processed with first encrypting processing and control data at least relevant to copyright control processing of the data and which is encrypted by second encrypting processing different from the first encrypting processing, the data and the control data being transmitted from an external device, first decrypting means for doing first decrypting processing, matched to the first encrypting processing, on the data received by the reception means, second decrypting means for doing second decrypting processing, matched to the second encrypting processing, on the data received by the reception means, outputting means for outputting data decrypted by the first decrypting means, and control means for doing copyright control processing of the data outputted by the outputting means, based on at least the control data decrypted by the second decrypting means, for controlling outputting processing of the outputting means.

This data transmission system performs different encoding processing on control data.

In a further aspect, the present invention provides a data transmission system including a data reproducing apparatus and a data processing apparatus. The data reproducing apparatus includes reproducing means for reproducing data recorded on a recording medium, including encryption means for encrypting the data reproduced by the reproducing means and control data of the data relevant at least to copyright control processing, transmission means for transmitting data encrypted by the encrypting means to an external signal processing device, reception means for receiving playback control data transmitted from the signal processing device, the playback control data being the data transmitted by the transmission means, the transmitted data being processed with copyright control processing, decrypting means for doing decrypting matched to encrypting of the playback control data received by the reception means, and control means for controlling the playback processing of the reproducing means based on the playback control data decrypted by the decrypting means. The data processing device includes reception means for receiving data and control data at least relevant to copyright control processing of the data, the data and the control data being encrypted and transmitted in this encrypted form from an external device, decrypting means for performing matched decrypting processing on the data and the control data received by the reception means, outputting means for outputting data decrypted by the decrypting means, control means for doing copyright control processing of the data outputted by the outputting means, based on at least the control data decrypted by the decrypting means, for generating transmission control data controlling the transmission processing of the data transmitted from the external device, encrypting means for performing encrypting processing on the transmission control data generated by the control means, the encrypting processing being different from that on the data and control data received by the reception means, and transmitting means for transmitting the transmission control data encrypted by the encrypting means to the external device.

This data transmission system performs different encryption processing on control data.

The data reproducing method according to the present invention reproduces data recorded on the recording medium, performs first encryption processing on the reproduced data, while performing second encryption processing different from the first encryption processing and transmitting the encrypted data and control data.

This data reproducing method performs different encryption processing on control data.

In a further aspect, the present invention provides a data reproducing method including reproducing data recorded a recording medium, performing first encryption processing on the reproduced data, performing second encryption processing, different from the first encryption processing, on at least control data for copyright control processing of the reproduced data, and transmitting the encrypted data and control data.

This data reproducing method similarly performs different encryption processing on control data.

In a further aspect, the present invention provides a data processing method including receiving data subjected to first encryption processing and at least control data of the data subjected to second encryption processing different from the first encryption processing, the data and the control data being subsequently transmitted from an external device, performing first decryption processing matched to the first encryption processing on the received data, performing second decryption processing matched to the second encryption processing on the received control data, performing at least copyright control processing based on control data subjected to the second decryption processing to control output processing.

This data processing method similarly performs different encryption processing on control data.

In a further aspect, the present invention provides a data processing method including receiving data and at least its control data relevant to copyright control processing, the data and the control data being encrypted and transmitted in this encrypted form from an external device, performing matched decryption processing on the received data and control data, outputting decrypted data, performing copyright control processing on the outputted data, based at least on the decrypted control data, to generate transmission control data controlling transmission of data from the external device, performing encryption processing different from that performed on the received data and control data on the generated transmission control data, and transmitting the encrypted transmission control data to the external device.

This data processing method similarly performs different encryption processing on control data.

In a further aspect, the present invention provides a data transmission method in which a transmitting side transmits data reproduced from a recording medium via a transmission medium and in which a reception side performs pre-set processing on transmitted data to output the processed data, wherein the transmitting side reproduces the data recorded on the recording medium, processes the reproduced data with first encryption, processes control data at least relevant to copyright control processing of the data with second encryption different from the first encryption, and transmits encrypted data and control data over a transmission medium, with the reception side receiving the transmitted data and control data, performing first decryption processing matched to the first decryption processing on the received data, and performing second decryption processing matched to the second decryption processing on the received control data. The decrypted data is outputted, and copyright control processing for the outputted data is performed based on at least the control data subjected to the second decryption processing.

This data transmitting method performs different encryption processing on control data.

In yet another aspect, the present invention provides a data transmission method in which a transmitting side transmits data reproduced from a recording medium via a transmission medium and in which a reception side performs pre-set processing on transmitted data to output the processed data, wherein the transmitting side reproduces the data recorded on the recording medium, processes the reproduced data and at least control data of the reproduced data relevant to copyright control processing with encryption, transmits the encrypted data and control data over a transmission medium to the reception side, receives the playback control data encrypted and transmitted in this encrypted form from the reception side, performs decryption processing matched to encryption processing of the received playback control data, and controls playback processing based on the decrypted playback control data sent from the reception side, and wherein the reception side receives the transmitted data and the control data, performs matched decryption processing on the received data and control data, outputs the decrypted data, performs copyright control processing of the outputted data based on at least the decrypted control data, generates transmission control data controlling the transmission of data from the transmitting side, performs decryption processing different from that performed on the received data and control data on the generated transmission control data and transmits the encrypted transmission control data to the transmitting side.

In the data reproducing apparatus, data processing apparatus, data transmitting system, data reproducing method, data processing method, and data transmitting method and apparatus, data and control data therefor are transmitted, while the control data is encrypted in a different manner from the data. This raises security with respect to unauthorized duplication.

DESCRIPTION OF THE PREFERRED EMBODIMENTS

Figure 1:
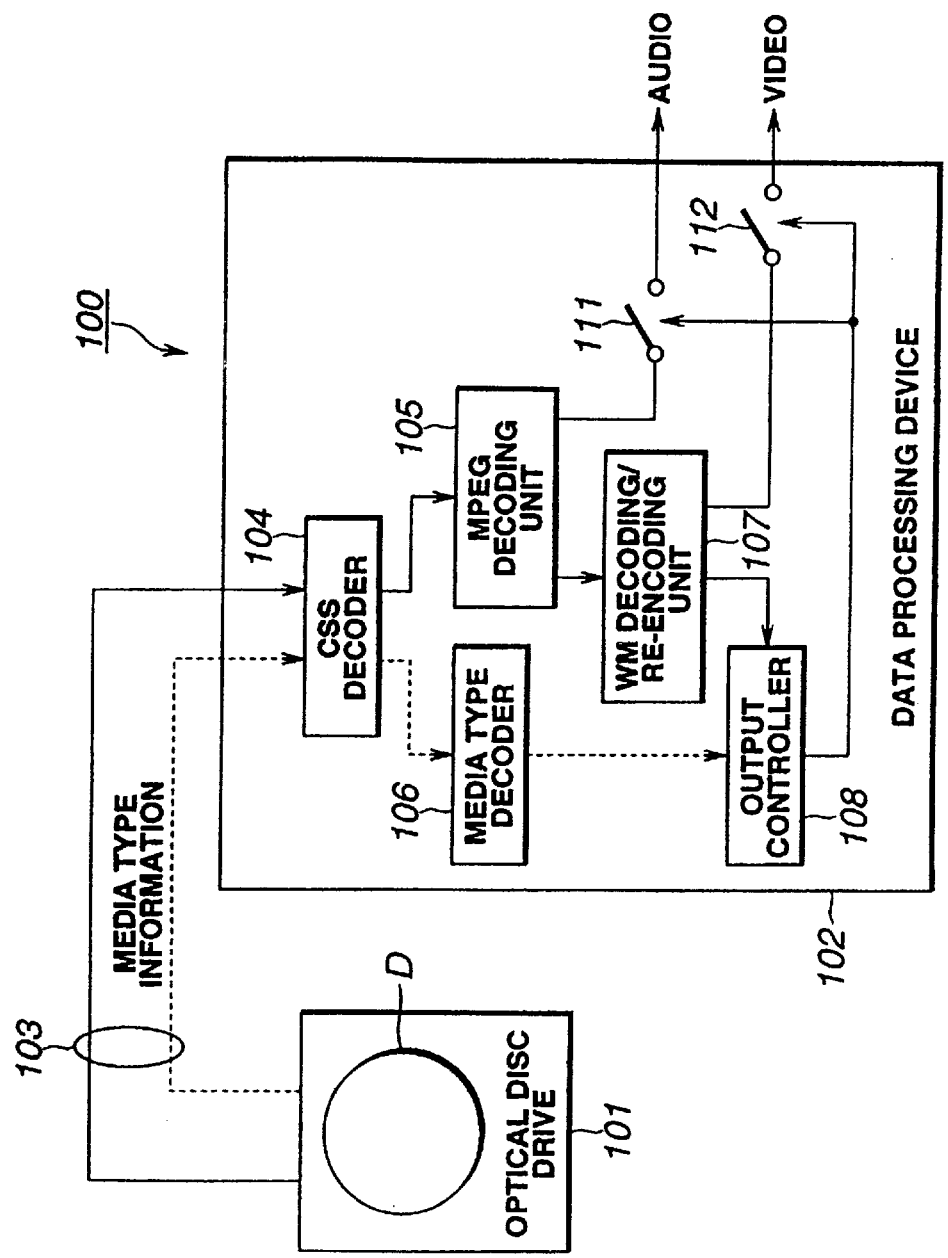
FIG. 1 is a block diagram of a conventional optical disc reproducing device adapted for performing watermark processing for encryption and copyright protection of transmitted data.
Figure 2:
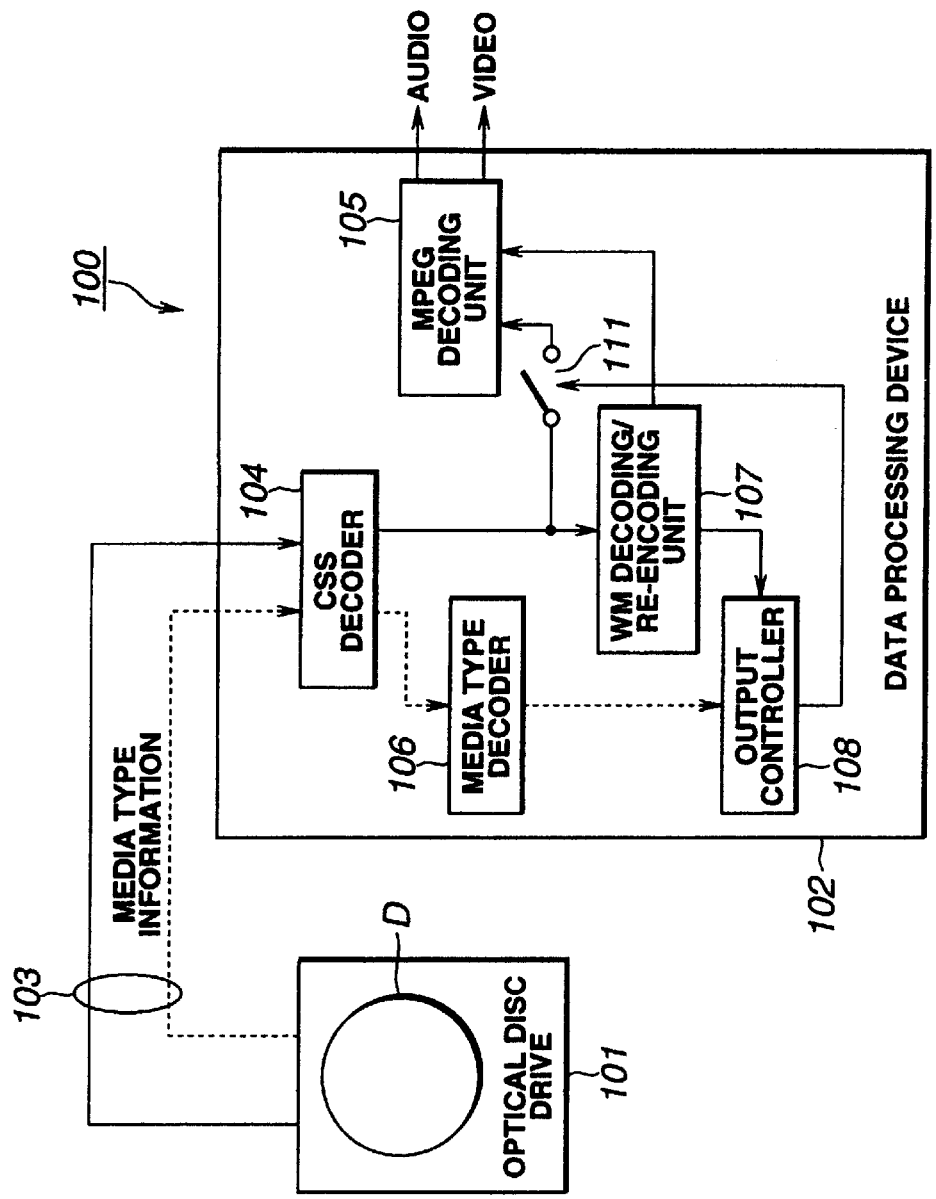
FIG. 2 is a block diagram of another conventional optical disc reproducing device adapted for performing watermark processing for encryption and copyright protection of transmitted data.
Figure 3:
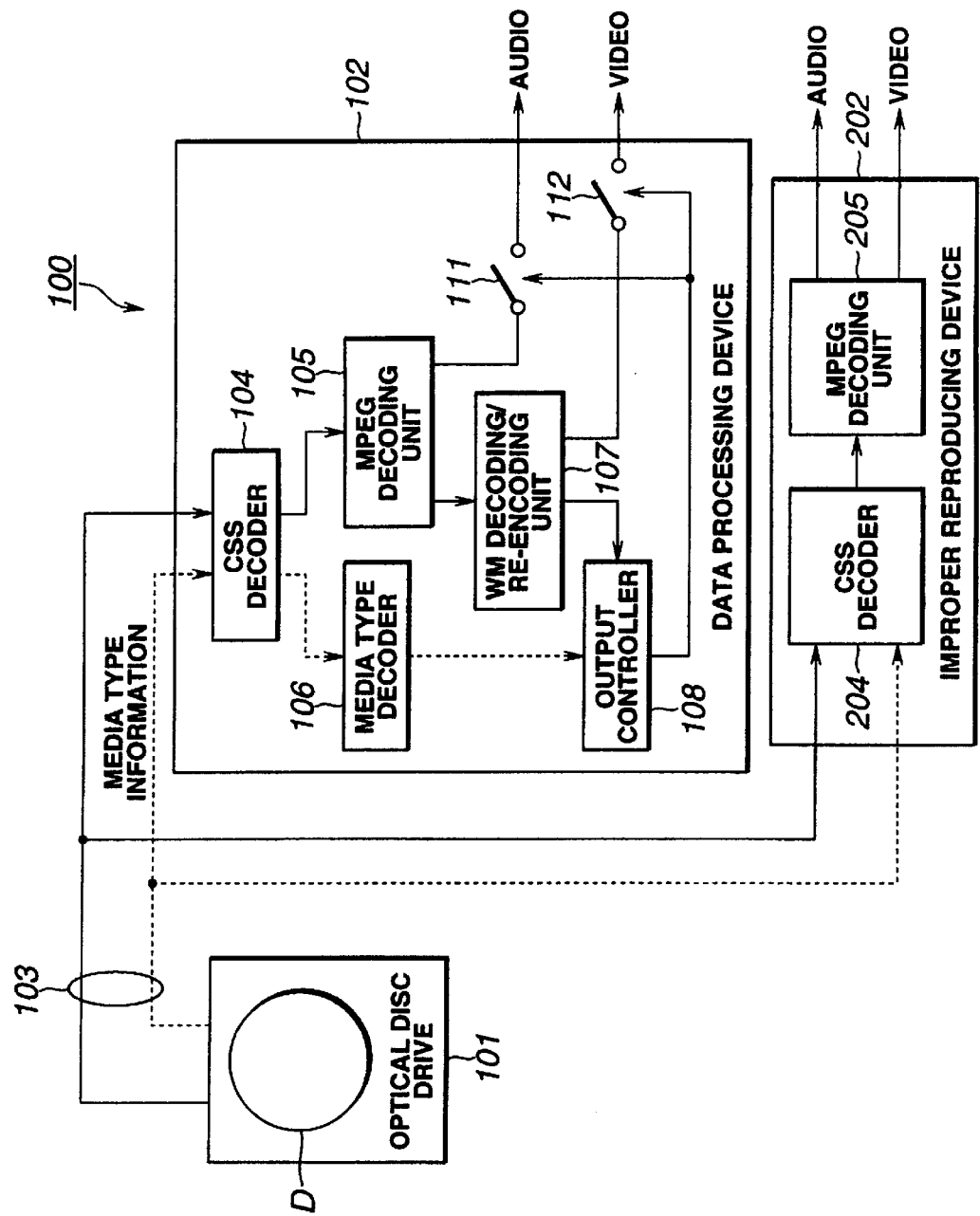
FIG. 3 is a block diagram of an unauthorized reproducing device for illicit duplication on the conventional optical disc reproducing device shown in FIGS. 1 or 2.

Referring to the drawings, first to fourth embodiments of an optical disc reproducing device according to the present invention will be explained in detail.

The optical disc reproducing device of the first to fourth embodiments, now explained, is made up of an optical disc drive, provided as an external device of a personal computer, and a data processing device loaded as, for example, a PC card of the personal computer. The optical disc device of the first to fourth embodiments reproduces the picture data and speech data from the optical disc and transmits the picture and speech data as digital data between the optical disc drive and the data processing device to perform predetermined data processing.

Figure 4:
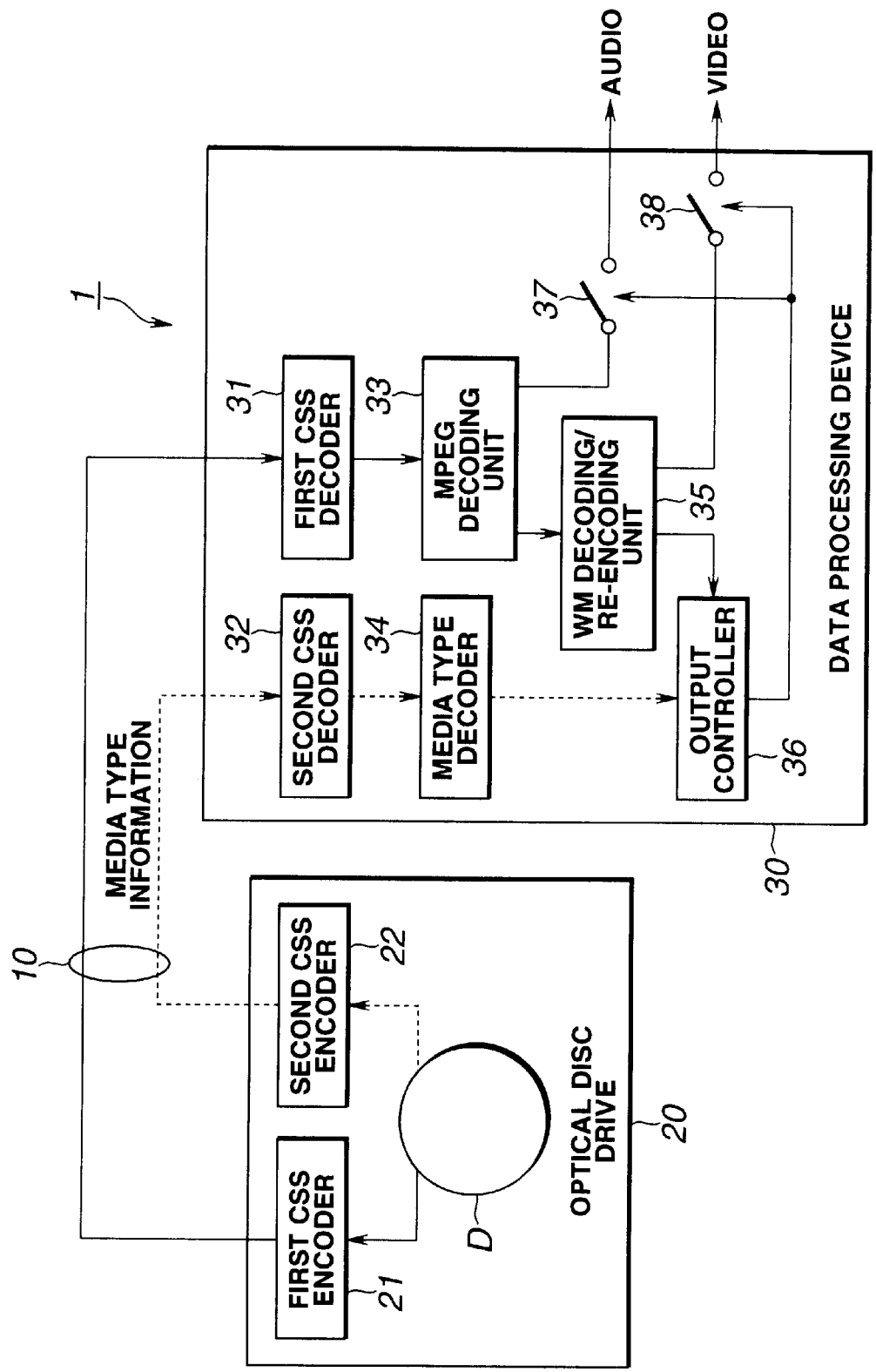
FIG. 4 is a block diagram of an optical disc reproducing device according to a first embodiment of the present invention.

Referring to FIG. 4, the first embodiment of the optical disc reproducing device 1 is explained.

The optical disc reproducing device 1 of the present first embodiment is made up of an optical disc drive 20 for reading out picture data or speech data recorded on the optical disc D, a data processing device 30 for doing data processing on the picture data etc read out from the optical disc drive 20, and a bus 10 interconnecting the optical disc drive 20 and the data processing device 30.

In the data area of the optical disc D are recorded picture data for moving or still pictures and speech data on the music or the speech, after compression in accordance with the MPEG system. On the picture data is superimposed the copyright control information by watermark processing, as described above.

The copyright information, superimposed on the picture data, may be exemplified by the following copyright control information:

That is, there are superimposed on the picture data "copy free", specifying that picture or music data recorded on the recording medium or transmitted can be copied, "one copy", specifying that only one copying operation is possible, "no more copy" specifying that data has been copied from the above "one copy" data, or "never copy" specifying that copying cannot be permitted. The reproducing device or the recording device, which has detected this copyright control information, limits reproduction or recording on the picture or music data.

On the optical disc D, there is recorded the media type information of this optical disc D, along with the above-mentioned picture data or audio data. This media type information is the information specifying whether the optical disc is the read-only ROM disc or a recordable RAM disc.

From this optical disc D, the above media type information as well as the compressed picture or audio data is read out by the optical disc drive 20.

The optical disc drive 20 includes a first CSS encoder 21 for encrypting the read-out compressed picture and speech data and a second CSS encoder 22 for encrypting the read-out media type information.

The first CSS encoder 21 and the second CSS encoder 22 perform encrypting by the so-called contents scramble system (CSS). The first CSS encoder 21 and the second CSS encoder 22 perform encrypting using different algorithms or different encryption keys.

The optical disc drive 20 sends the encrypted compressed picture and speech data and media type information to the bus 10 via an output interface, not shown. These different types of the information are transmitted over this bus 10 to the data processing device 30. Therefore, picture data etc and the media type information, encrypted by respective different encrypting systems, are transmitted over this bus 10.

Meanwhile, if the compressed picture data etc and the media type information are recorded on the optical disc D in respective different encrypted state, it is possible for the optical disc drive 20 to transmit the information or data without encryption.

It is possible for the second CSS encoder 22 to encrypt not only the media type information but also other control data. For example, the second CSS encoder 22 is able to encrypt the sub-code information for the picture data etc, or the CGMS-D codes used for copyright protection control.

The data processing device 30 includes a first CSS decoder 31, a second CSS decoder 32, an MPEG decoder 33, a media type decoder 34, a watermark (WM) detection/re-encoding unit 35, an output controller 36 and switches 37, 38.

The first CSS decoder 31 is supplied with the encrypted and transmitted compressed video and speech data via an interface, not shown. The first CSS decoder 31 performs decryption in accordance with the algorithm matched to the first CSS encoder 21 or using the matched encryption key. If decryption is not made using the correct decryption key, the ensuing processing cannot be effectuated. If decryption is done using the correct encryption key, the first CSS decoder 31 sends the picture data and the speech data to the MPEG decoder 33.

The second CSS decoder 32 is supplied with the encrypted and transmitted media type information via an interface, not shown. This second CSS decoder 32 performs decryption processing by an algorithm matched to that of the second CSS encoder 22 and using the matched encryption key. If decryption is not made using the correct decryption key, the ensuing processing cannot be effectuated. If decryption is done using the correct encryption key, the second CSS decoder 32 sends the media type information to the media type decoder 34.

The first CSS decoder 31 and the second CSS decoder 32 perform encryption using different algorithms or different encryption keys in a corresponding manner to the first and second CSS encoders 21 and 22, respectively. Thus, if decryption cannot be effectuated in one of the first or second CSS decoders 31, 32, outputting is halted in its entirety so that no ensuing processing can be performed.

The MPEG decoder 33 expands the compressed picture and audio data. The expanded picture data is sent to the watermark (WM) detection/re-encoding unit 35. The expanded speech data is outputted to outside via switch 37.

The medium type decoder decodes the media type information supplied from the second CSS decoder 32 to detect the information on whether the optical disc D reproduced by the optical disc drive 20 is the ROM disc or the RAM disc to send the detected information to the output controller 37.

The watermark (WM) detection/re-encoding unit 35 detects the copyright control information superimposed on the picture data by watermark processing. The detected copyright control information specifies one of "copy free", "one copy", "no more copy" or "never copy", as described above. The watermark (WM) detection/re-encoding unit 35 sends the detected copyright control information to the output controller 36. If, as a result of the detection of the copyright control information the watermark (WM) detection/re-encoding unit 35 detects "one copy", it re-encodes the copyright control information superimposed on the picture data, using watermark processing, for changing "one copy" to "no more copy", to output the re-encoded copyright control information to outside via switch 38. If, as a result of the detection of the copyright control information the watermark (WM) detection/re-encoding unit 35 detects the copyright control information other than "one copy", it outputs the detected copyright control information to outside via switch 38 without doing re-encoding.

The output controller 36 performs on/off control of the switches 37, 38 based on the information sent from the media type decoder 34 and from the watermark (WM) detection/re-encoding unit 35. Specifically, if the optical disc D is the ROM disc and the copyright control information is the "no more copy", and if the optical disc D is the RAM disc and the copyright control information is "one copy", the output controller 36 assumes that the data recorded on the optical disc D has been copied illicitly and performs control to turn the switches 37, 38 off.

The above-described optical disc reproducing device 1 of the first embodiment of the present invention encrypts the media type information as control data, and the picture and speech data, using respective different systems. Thus, with the present optical disc reproducing device 1, since the two types of data need to be decrypted, illicit duplication or reproduction cannot be made if one of the two types of data is attacked, thus improving the security.

Figure 5:
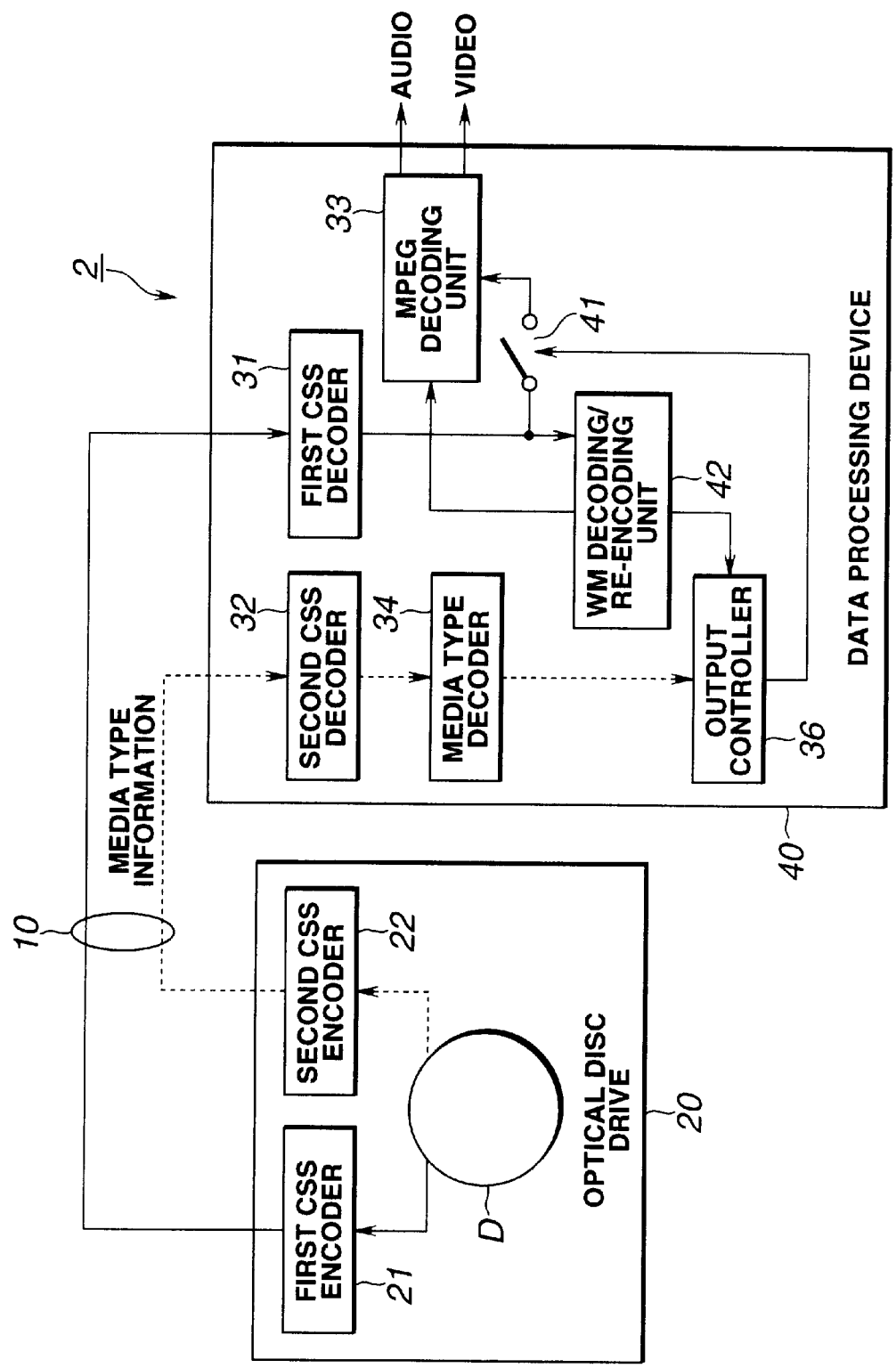
FIG. 5 is a block diagram of an optical disc reproducing device according to a second embodiment of the present invention.

Referring to FIG. 5, the second embodiment of the optical disc reproducing device is explained.

In the following explanation of the second embodiment of the optical disc reproducing device, the parts or components which are the same as those of the first embodiment are depicted by the same reference numerals and are not explained specifically. The same applies for the third and fourth embodiments of the optical disc reproducing device.

An optical disc reproducing device 2 includes an optical disc drive 20, for reading out picture or speech data recorded on the optical disc D, a data processing device 40 for doing data processing on picture data etc read out from the optical disc drive 20, and a bus 10 for interconnecting the optical disc drive 20 and the data processing device 40.

In a data area of the optical disc D, picture data for moving and still pictures and speech data for music or speech are compressed in accordance with the MPEG system and recorded in this compressed form. On the compressed picture data, there is superimposed the copyright control information by watermark processing in its elementary stream state. Thus, in detecting the copyright control information, the copyright control information needs to be detected prior to MPEG expansion.

The optical disc drive 20 includes a first CSS encoder 21 for encrypting the read-out compressed picture and speech data and a second CSS encoder 22 for encrypting the read-out media type information.

The optical disc drive 20 sends the encrypted compressed picture and speech data and media type information to the bus 10 via an output interface, not shown. These different types of the information are transmitted over this bus 10 to the data processing device 40. Therefore, picture data etc and the media type information, encrypted by respective different encrypting systems, are transmitted over this bus 10.

The data processing device 40 includes a first CSS decoder 31, a second CSS decoder 32, an MPEG decoder 33, a media type decoder 34, a watermark (WM) detection/re-encoding unit 42, an output controller 36 and switches 37, 38.

The first CSS decoder 31 is supplied with the compressed video and speech data, transmitted in an encrypted form, via an interface, not shown. The first CSS decoder 31 performs decryption in accordance with the algorithm matched to the first CSS encoder 21 or using the matched encryption key. If decryption is not made using the correct decryption key, the ensuing processing cannot be effectuated. If decryption is done using the correct encryption key, the first CSS decoder 31 sends the picture data and the speech data to the MPEG decoder 33 via switch 41 on/off controlled by the output controller 36. The first CSS decoder 31 also sends the picture data and speech data to the watermark (WM) detection/re-encoding unit 42.

The second CSS decoder 32 is fed with encrypted and transmitted media type information via an input interface, not shown. This second CSS decoder 32 performs decryption by an algorithm matched to that of the second CSS encoder 22 and using matched encryption keys. If decryption is not made using the correct decryption key, the ensuing processing cannot be effectuated. If decryption is done using the correct encryption key, the second CSS decoder 32 sends the media type information to the media type decoder 34.

The first and second CSS decoders 31, 32 effectuate encryption by employing different algorithms or different encryption keys in association with the first and second CSS encoders 21, 22. Therefore, if decryption cannot be done by one of the first and second CSS decoders 31, 32, outputting is halted so as to inhibit the ensuing operations.

The MPEG decoder 33 expands the compressed picture and speech data. The expanded picture and speech data are outputted to outside.

The watermark (WM) detection/re-encoding unit 42 detects the copyright control information superimposed by watermark processing on the picture data. This watermark (WM) detection/re-encoding unit 42 detects the copyright control information in the form of an elementary stream compressed in accordance with the MPEG system. If, as a result of detection of the copyright control information, "one copy" is detected, the watermark (WM) detection/re-encoding unit 42 re-encodes the copyright control information superimposed on the picture data by watermark processing to change "one copy" to "no more copy". The watermark (WM) detection/re-encoding unit 42 then sends the re-encoded copyright control information to the MPEG decoder 33. If, as a result of detection of the copyright control information, the copyright control information other than "one copy" is detected, the watermark (WM) detection/re-encoding unit 42 sends the detected copyright control information to the MPEG decoder 33 without doing re-encoding.

The output controller 36 controls the switch to its on or off states, based on the information supplied from the media type decoder 34 and the watermark (WM) detection/re-encoding unit 42.

The above-described optical disc reproducing device 2 of the second embodiment of the present invention encrypts the media type information as control data and the picture and speech data using different systems. Thus, with the present optical disc reproducing device 2, since the two types of data need to be decrypted, illicit duplication or reproduction cannot be made if one of the two types of data is attacked, thus improving the security. Moreover, with the present optical disc reproducing device 2, the playback output for copyright control is halted to perform copyright control before supplying the copyright control information to the MPEG decoder 33, reproduction limitation and recording limitation for copyright protection can be achieved with higher security.

Figure 6:
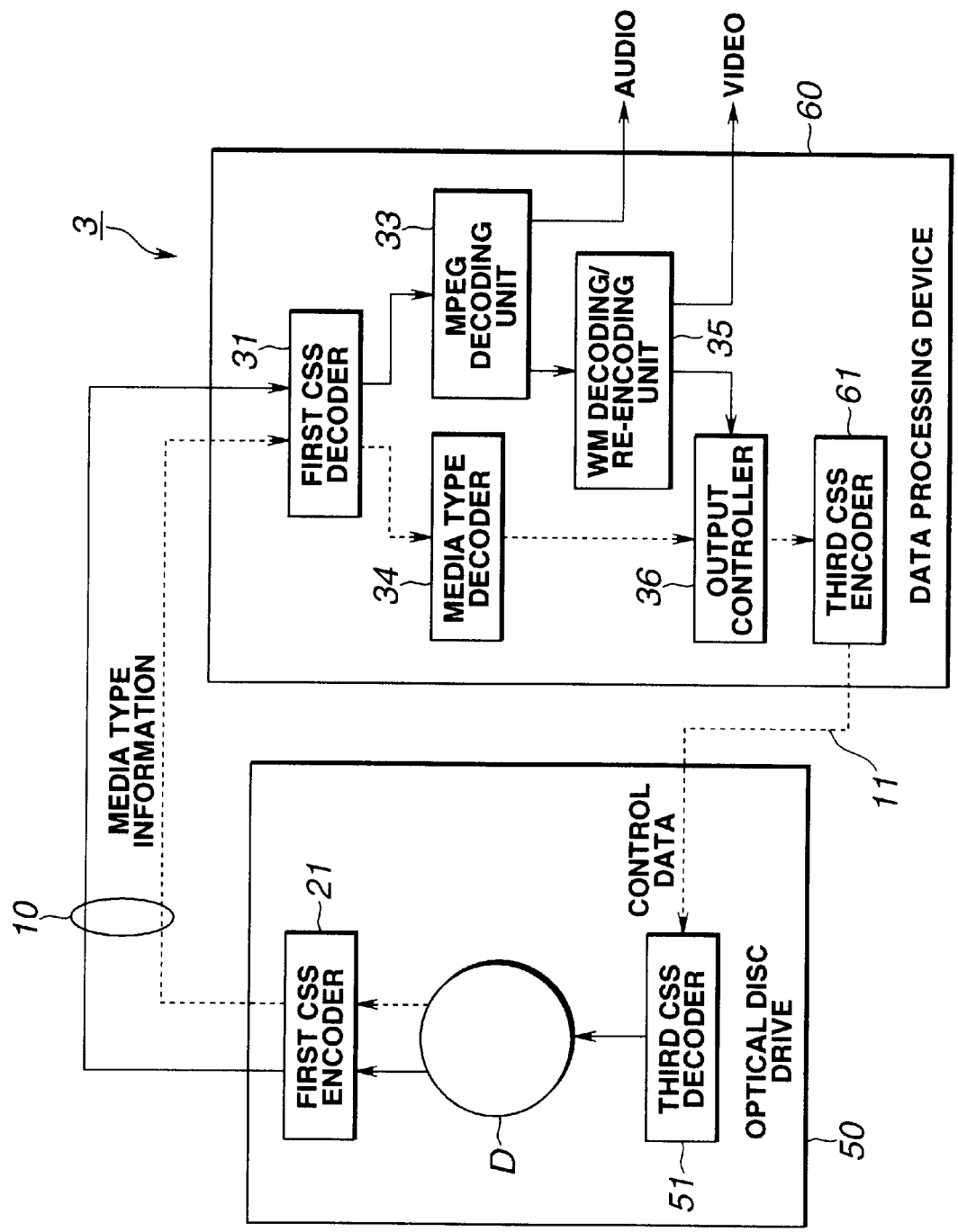
FIG. 6 is a block diagram of an optical disc reproducing device according to a third embodiment of the present invention.

Referring to FIG. 6, the second embodiment of the optical disc reproducing device is explained.

An optical disc reproducing device 3 of the present third embodiment includes an optical disc drive 50, for reading out picture or speech data recorded on the optical disc D, a data processing device 60 for doing data processing on picture data etc read out from the optical disc drive 50, and buses 10, 11 for interconnecting the optical disc drive 50 and the data processing device 60.

In a data area of the optical disc D, picture data for moving and still pictures and speech data for music or speech are compressed in accordance with the MPEG system and recorded in this compressed form. On the picture data, the copyright control information is superimposed by the above-described watermark processing.

The optical disc drive 50 includes a first CSS encoder 21 for encrypting the compressed picture data, compressed audio data and media type information, as read out, and a third CSS decoder 51 for decrypting the control data transmitted from the data processing device 60.

The first CSS encoder 21 encrypts the compressed picture data, compressed audio data and media type information by so-called CSS.

To the third CSS decoder 51, control data for copyright control is sent from the data processing device 60 via an input interface, not shown. This control data is already encrypted using algorithms or encryption keys different from those for the picture data etc and the media type information. This third CSS decoder 51 performs corresponding decrypting operations to halt the optical disc reproducing operation, based on the control data contents.

The optical disc drive 50 sends the encrypted compressed picture data, compressed audio data and media type information to the bus 10 via an output interface, not shown. These data or the information are transmitted over the bus 10 to the data processing device 60. The optical disc drive 50 also acquires the encrypted control data for halting the optical disc D from the data processing device 60 over the bus 11. Thus, the picture data etc, media type information and the control data, encrypted using respective different encoding systems, are transmitted over the buses 10 and 11.

The data processing device 60 includes a first CSS decoder 31, an MPEG decoder 33, a media type decoder 34, a watermark (WM) detection/re-encoding unit 35, an output controller 36 and a third CSS encoder 61.

The first CSS decoder 31 is supplied with compressed picture data, compressed audio data and media type information, transmitted following the encryption, and decrypts the data or the information using pre-set encryption keys. If the decryption is done using the correct encryption key, the picture and speech data are sent to the MPEG decoder 33, while the media type information is sent to the media type decoder 34.

The MPEG decoder 33 expands the compressed picture and audio data. The expanded picture data is sent to the watermark (WM) detection/re-encoding unit 35. The expanded speech data is outputted to outside.

The media type decoder 34 decodes the media type information supplied from the first CSS decoder 31 to detect the information as to whether the optical disc D being reproduced by the optical disc drive 50 is the ROM disc or the RAM disc to send the detected information to the output controller 36.

The watermark (WM) detection/re-encoding unit 35 detects the copyright control information superimposed by watermark processing on the picture data. The detected copyright control information specifies one of "copy free", "one copy", "no more copy" or "never copy", as described above. The watermark (WM) detection/re-encoding unit 35 sends the detected copyright control information to the output controller 36. If, as a result of the detection of the copyright control information the watermark (WM) detection/re-encoding unit 35 detects "one copy", it re-encodes the copyright control information superimposed on the picture data, using watermark processing, for changing "one copy" to "no more copy", to output the re-encoded copyright control information to outside via switch 38. If, as a result of the detection of the copyright control information the watermark (WM) detection/re-encoding unit 35 detects the copyright control information other than "one copy", it outputs the detected copyright control information to outside via switch 38 without doing re-encoding.

The output controller 36 performs control for halting the reproduction of the optical disc drive 50 based on the information sent from the media type decoder 34 and from the watermark (WM) detection/re-encoding unit 35. Specifically, if the optical disc D is the ROM disc and the copyright control information is the "no more copy", and if the optical disc D is the RAM disc and the copyright control information is "one copy", the output controller 36 assumes that the data recorded on the optical disc D has been copied illicitly and performs control to halt the reproducing operation for the optical disc drive 50.

The third CSS encoder 61 encrypts the control data, using the algorithm or encryption keys different from those used for the picture data etc and the media type information. The third CSS encoder 61 sends the encrypted control data via an output interface, not shown, to the bus 11, and thence sends the data to the optical disc drive 50. Thus, the control data, encrypted in accordance with the encrypting system different from that for data transmitted over bus 10, is transmitted over this bus 11.

To the third CSS decoder 51 of the optical disc drive 50, the control data encrypted and transmitted by the third CSS decoder 51 is entered via an input interface, not shown. This third CSS decoder 51 decrypts the data using an algorithm or encryption keys matched to that of the third CSS encoder 61. If the correct encryption keys are not used for decryption, the ensuing processing is not effectuated, so that the reproducing operation of the optical disc is halted. If the correct encryption keys are used for decryption, but the output controller 36 verifies that the data recorded on the optical disc D has been duplicated illicitly, the third CSS decoder 51 halts the reproducing operation of the optical disc D based on the supplied control data.

With the optical disc reproducing device 3 of the third embodiment, the data transmitted between the optical disc drive 50 and the data processing device 60 is encrypted using respective different systems. Thus, with the present optical disc reproducing device 3, since the two types of data need to be decrypted, illicit duplication or reproduction cannot be made if one of the two types of data is attacked, thus improving the security. Moreover, with the present optical disc reproducing device, since the playback output for copyright control is halted on the optical disc drive 50 prior to transmission of picture data etc over the bus 10, playback limitation and recording limitation for copyright protection can be achieved with higher security.

Figure 7:
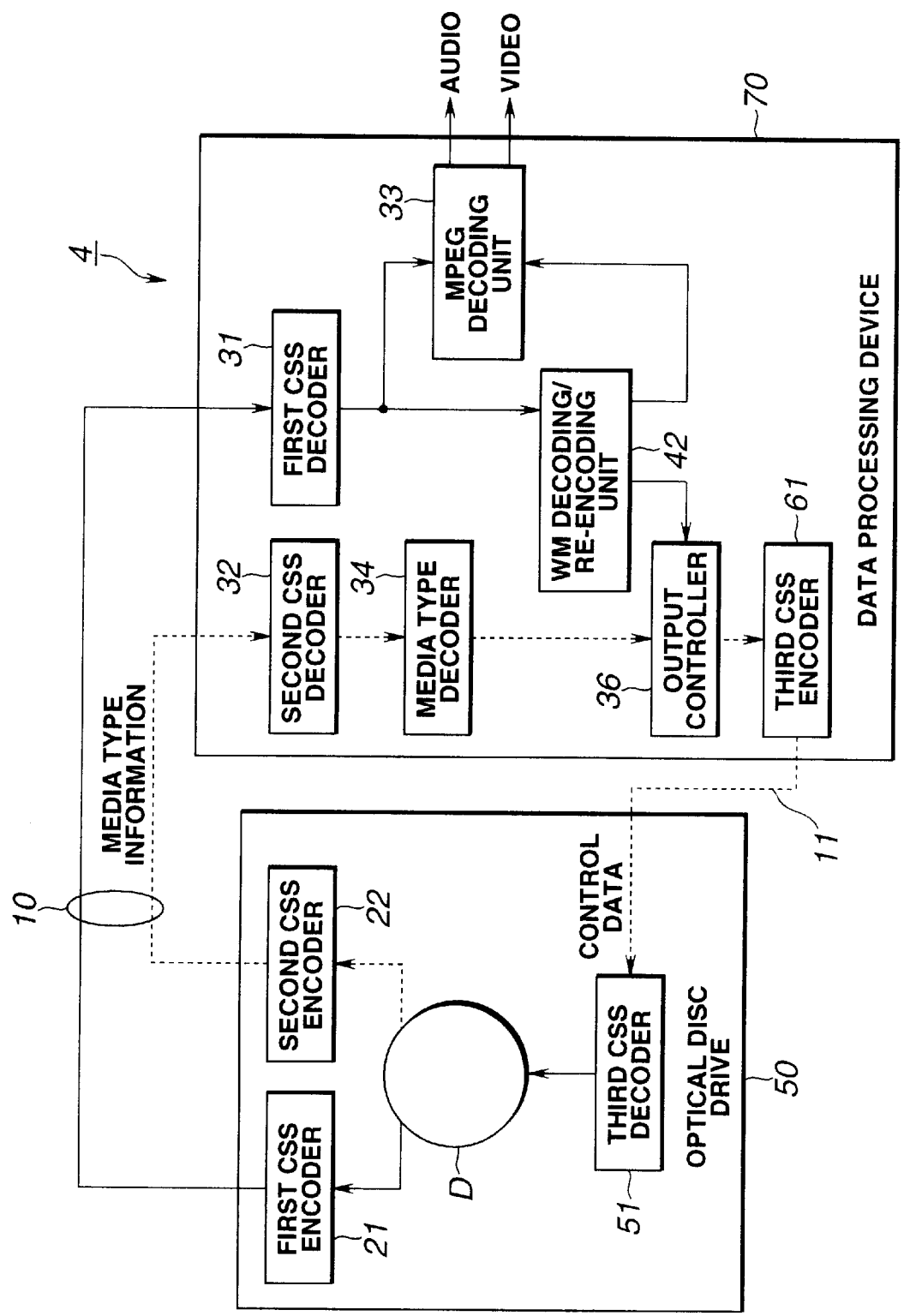
FIG. 7 is a block diagram of an optical disc reproducing device according to a fourth embodiment of the present invention.

Referring to FIG. 7, the fourth embodiment of the optical disc reproducing device is explained.

An optical disc reproducing device 4 of the present fourth embodiment includes an optical disc drive 50, for reading out picture or speech data recorded on the optical disc D, a data processing device 70 for doing data processing on picture data etc read out from the optical disc drive 50, and buses 10, 11 for interconnecting the optical disc drive 50 and the data processing device 70.

In a data area of the optical disc D, picture data for moving and still pictures and speech data for music or speech are compressed in accordance with the MPEG system and recorded in this compressed form. On the compressed picture data, in a state of its elementary stream, there is superimposed the copyright control information by watermark processing. Thus, for detecting this copyright control information, it is necessary to perform detection prior to MPEG expansion.

The optical disc drive 20 includes a first CSS encoder 21, for encrypting the compressed picture data and the compressed speech data, as read out, a second CSS encoder 22 for encrypting the read-out media type information and a third CSS decoder 51 for decrypting the control data transmitted from the data processing device 70.

The third CSS decoder 51 is supplied with control data for copyright control from the data processing device 70 via an input interface, not shown. This control data is encrypted using an algorithm or encryption keys different from those for the picture data etc or the media type information. This third CSS decoder 51 performs corresponding decryption to halt the playback operation for the optical disc D based on the contents of the control data.

The optical disc drive 50 sends the encrypted compressed picture and speech data and the encrypted media type information to the bus 10 via an output interface, not shown. These data and information are transmitted from this bus 10 to the data processing device 70. The optical disc drive 50 also acquires the encrypted control data for halting the optical disc D from the data processing device 70 over the bus 10. Thus, the picture data etc and the media type information encrypted by respective different encrypting systems are transmitted on this bus 10, while control data encrypted by an encryption system different form that transmitted on the bus 10 is transmitted on the bus 11.

The data processing device 70 includes a first CSS decoder 31, a second CSS decoder 32, a media type decoder 34, a watermark (WM) detection/re-encoding unit 42, an output controller 36 and a third CSS encoder 61.

The first CSS decoder 31 is supplied with compressed picture data and compressed speech data, encrypted and transmitted in this form, via an input interface, not shown, and decrypts the data by an algorithm and the encryption key matched to those for the first CSS encoder 21. If the decryption is not done using the correct encryption key, the ensuing processing cannot be executed. If the decryption is done using the correct encryption key, the first CSS decoder 31 sends the picture data and the speech data to the watermark (WM) detection/re-encoding unit 42.

The second CSS decoder 32 is supplied with compressed picture data and compressed speech data, encrypted and transmitted in this form, via an input interface, not shown, and decrypts the data by an algorithm and the encryption key matched to those for the second CSS encoder 22. If the decryption is not done using the correct encryption key, the ensuing processing cannot be executed. If the decryption is done using the correct encryption key, the second CSS decoder 32 sends the media typw information y to the media type decoder 34.

The MPEG decoder 33 expands the compressed picture and speech data. The expanded picture and speech data are outputted to outside.

The watermark (WM) detection/re-encoding unit 42 detects the copyright control information superimposed by watermark processing. The watermark (WM) detection/re-encoding unit 42 detects the copyright control information in the state of an elementary stream compressed in accordance with the MPEG system. The watermark (WM) detection/re-encoding unit 42 sends the detected copyright control information to the output controller 36. If, as a result of the detection of the copyright control information, the watermark (WM) detection/re-encoding unit 42 detects "one copy", it re-encodes the copyright control information superimposed on the picture data, using watermark processing, for changing "one copy" to "no more copy", to output the re-encoded copyright control information to the MPEG decoder 33. If, as a result of the detection of the copyright control information, the watermark (WM) detection/re-encoding unit 42 detects the copyright control information other than "one copy", it outputs the detected copyright control information to outside via switch 38 without doing re-encoding.

The output controller 36 performs control for halting the reproduction of the optical disc drive 50 based on the information sent from the media type decoder 34 and from the watermark (WM) detection/re-encoding unit 35. Specifically, if the optical disc D is the ROM disc and the copyright control information is the "no more copy", and if the optical disc D is the RAM disc and the copyright control information is "one copy", the output controller 36 assumes that the data recorded on the optical disc D has been copied illicitly and performs control to halt the reproducing operation for the optical disc drive 50. The output controller 36 sends this control data to the third CSS encoder 61.

The third CSS encoder 61 encrypts the control data, using the algorithm or encryption keys different from those used for the picture data etc and from the media type information. The third CSS encoder 61 sends the encrypted control data via an output interface, not shown, to the bus 11, and thence sends the data to the optical disc drive 50. Thus, the control data, encrypted in accordance with the encrypting system different from that for data transmitted over bus 10, is transmitted over this bus 11. Therefore, control data encrypted by an encryption system different from that for data transmitted on the bus 10 is transmitted on the bus 10.

To the third CSS decoder 51 of the optical disc drive 50, the control data encrypted and transmitted by the third CSS decoder 51, is entered via an input interface, not shown. This third CSS decoder 51 decrypts the data using an algorithm or encryption keys matched to those of the third CSS encoder 61. If the correct encryption keys are not used for decryption, the ensuing processing is not effectuated, so that the reproducing operation of the optical disc is halted. If the correct encryption keys are used for decryption, but the output controller 36 verifies that the data recorded on the optical disc D has been duplicated illicitly, the third CSS decoder 51 halts the reproducing operation of the optical disc D based on the supplied control data.

With the optical disc reproducing device 3 of the third embodiment, the data transmitted between the optical disc drive 50 and the data processing device 60 is encrypted using respective different systems for control data and picture data. Thus, with the present optical disc reproducing device 3, since the two types of data need to be decrypted, illicit duplication or reproduction cannot be made if one of the two types of data is attacked, thus improving the security. Moreover, with the present optical disc reproducing device, since the playback output for copyright control is halted on the optical disc drive 50 prior to transmission of picture data etc over the bus 10, playback limitation and recording limitation for copyright protection can be in the achieved with higher security.

In the above explanation of the first to fourth embodiments, the present invention is retained to be directed to a reproducing device for an optical disc applied to, for example, a personal computer. The present invention, however, is not applied to this configuration and may also be applied to a system employing the Internet or the digital broadcasting satellite as a transmission medium. In this case, there is constructed such a system in which the reproducing device side operates as a server and the data processing device side operates as a client, and in which encryption is performed on the picture data etc and control data therefor being transmitted. That is, high security can be achieved against unauthorized duplication in the system employing the Internet and the digital satellite broadcast.

What is claimed is:

1. A data reproducing apparatus for reproducing audio visual data, comprising:

reproducing means for reproducing first and second data recorded on a recording medium;

first encryption means for performing first encryption processing on said first data reproduced from said recording medium by said reproducing means, said first data comprising medium type information;

second encryption means for performing second encryption processing different from said first encryption processing on said second data reproduced from said recording medium by said reproducing means, said second data comprising copyright control information, and said second encryption processing comprising watermark processing to superimpose said second data on said audio visual data; and transmission means for transmitting the data encrypted by said first encryption means and the second encryption means;

wherein said copyright control information and said medium type information are used to control copyright control processing.

2. The data reproducing apparatus according to claim 1 wherein said reproducing means reproduces said audio visual data.

3. The data reproducing apparatus according to claim 2 wherein the copyright control information is superimposed by watermark processing on said audio visual data after being reproduced as part of said audio visual data.

4. A data reproducing apparatus for reproducing audio visual data, comprising:

reproducing means for reproducing first and second data recorded on a recording medium;

encryption means for encrypting the first data reproduced by said reproducing means comprising medium-type information in accordance with a first encryption processing and for encrypting the second data reproduced by said reproducing means, comprising copyright control information relevant at least to copyright control processing of said audio visual data, in accordance with a superimposing watermark process;

transmission means for transmitting said first and second data encrypted by said encrypting means to an external signal processing device;

reception means for receiving playback control data transmitted from said external signal processing device, said playback control data comprising said data transmitted by said transmission means encrypted in a manner different from said encrypting by said encrypting means and processed with copyright control processing;

decrypting means for performing decryption processing matched to encryption of said playback control data received by said reception means; and control means for controlling the playback processing of said reproducing means based on said playback control data decrypted by said decrypting means.

5. The data reproducing apparatus according to claim 4 wherein said reproducing means reproduces said audio visual data.

6. The data reproducing apparatus according to claim 5 wherein the copyright control information is superimposed by watermark processing on said audio visual data after being reproduced as part of said audio visual data.

7. The data reproducing apparatus according to claim 4 wherein said encryption means includes first encrypting means for performing first encryption processing on said first data reproduced by said reproducing means and a second encrypting means for performing second encryption processing different from said first encryption processing on at least said copyright control information of said second reproduced data relevant to copyright control processing;

said reception means receiving playback control data encrypted in a manner different from both said first encryption processing and said second encryption processing.

8. The data reproducing apparatus according to claim 7 wherein said reproducing means reproduces said audio visual data.

9. The data reproducing apparatus according to claim 8 wherein the copyright control information is superimposed by watermark processing on said audio visual data after being reproduced as part of said audio visual data.

10. A data processing apparatus for reproducing audio visual data, comprising:

reception means for receiving first data processed in accordance with first encryption processing and second data superimposed on said audio visual data in accordance with watermark processing different from said first encryption processing, comprising copyright control information at least relevant to copyright control processing of said audio visual data, said first and second data being transmitted from an external device;

first decrypting means for performing first decryption processing, matched to said first encryption processing, on said first data received by said reception means, said first data comprising media-type information;

second decrypting means for performing second decryption processing, matched to said watermark processing, on said second data received by said reception means;

outputting means for outputting data decrypted by said second decrypting means; and control means for performing copyright control processing of said data output by said outputting means, based on at least the first data decrypted by the first decryption means and the second data, comprising copyright control information, decrypted by said second decrypting means, for controlling outputting processing of said outputting means.

11. The data processing apparatus according to claim 10 wherein said reception means receives said audio visual data and said copyright control information.

12. The data processing apparatus according to claim 11 wherein the copyright control information is superimposed by watermark processing on said audio visual data;

copyright control information detecting means being provided for detecting the copyright control information from the second data decrypted by said second decrypting means;

said control means performing output control of said data output by said outputting means based on said copyright control information detected by said copyright control information detection means and based on said medium-type information decrypted by said first decrypting means.

13. A data processing apparatus for reproducing audio visual data, comprising:

reception means for receiving first data comprising medium-type information and second data, comprising copyright control information at least relevant to copyright control processing of said audio visual data, said first data being encrypted in accordance with a first encryption process and the second data being superimposed on said audio visual data in accordance with watermark processing, said first and second data being transmitted in this encrypted form from an external device;

decrypting means for performing matched decryption processing on said first data and said second data received by said reception means;

outputting means for outputting data decrypted by said decrypting means;

control means for performing copyright control processing of said data output by said outputting means, based on at least the first data and second data decrypted by said decrypting means, for generating transmission control data for controlling transmission processing of said data transmitted from said external device;

encrypting means for performing encryption processing on said transmission control data generated by said control means, said encryption processing being different from that performed on the first and second data received by said reception means; and transmitting means for transmitting the transmission control data encrypted by said encrypting means to said external device.

14. The data processing apparatus according to claim 13 wherein said reception means receives said audio visual data and the first and second data for the copyright control processing thereof.

15. The data processing apparatus according to claim 14 wherein the copyright control information is superimposed by watermark processing on said audio visual data;

copyright control information detection means being provided for detecting the copyright control information from the first and second data decrypted by said decrypting means received via said reception means;

said control means performing copyright control processing controlling of said data output by said outputting means, based on said copyright control information detected by said copyright control information detection means and based on said medium-type information decrypted by said decrypting means, for generating transmission control data controlling transmission processing of data transmitted from said external device.

16. The data processing apparatus according to claim 13 wherein said reception means receiving said first data processed with first encryption processing and said second data, comprising copyright control information at least relevant to copyright control processing of said audio visual data and which is superimposed in accordance with watermark processing, said first data and the second data being transmitted from an external device;

said decrypting means including first decrypting means for performing decryption processing, matched to said first encryption processing, on said first data received by said reception means, and second decrypting means for performing decryption processing, matched to said watermark processing, on said second data received by said reception means; and said encrypting means performs encryption processing on the transmission control data, said encrypting processing being different from both said first encryption processing and said watermark processing.

17. The data processing apparatus according to claim 16 wherein said reception means receives said audio visual data and said copyright control information for the copyright control processing thereof.

18. The data processing apparatus according to claim 17 wherein the copyright control information is superimposed by watermark processing on said audio visual data;

copyright control information detection means being provided for detecting the copyright control information from the second data decrypted by said second decrypting means;

said control means performing output control processing of said data output by said outputting means based on said copyright control information detected by said copyright control information detection means and based on said medium-type information decrypted by said first decrypting means for generating transmission control data controlling the transmission processing of data transmitted from said external device.

19. A data transmission system comprising a data reproducing apparatus and a data processing apparatus, in which audio visual data reproduced from a recording medium by said data reproducing apparatus is transmitted to said data processing apparatus, the transmitted data being processed in a predetermined manner by said data processing apparatus and in which the processed data is then output, said data reproducing apparatus including reproducing means for reproducing first and second data recorded on a recording medium, first encryption means for performing first encryption processing on said first data reproduced from said recording medium by said reproducing means, said first data comprising medium-type information, second encryption means for performing second encryption processing different from said first encryption processing on said second data reproduced from said recording medium by said reproducing means, said second data comprising copyright control information, and said second encryption processing comprising watermark processing to superimpose said second data on said audio visual data, and transmission means for transmitting the data encrypted by said first encryption means and the second encryption means;

said data processing apparatus including reception means for receiving first data processed with said first encryption processing and second data superimposed on said audio visual data in accordance with said watermark processing different from said first encryption processing, comprising copyright control information at least relevant to copyright control processing of said audio visual data, said first and second data being transmitted from an external device, first decrypting means for performing first decryption processing, matched to said first encryption processing, on said first data received by said reception means, second decrypting means for performing second decryption processing, matched to said watermark processing, on said second data received by said reception means, outputting means for outputting data decrypted by said second decrypting means, and control means for performing copyright control processing of said data output by said outputting means, based on at least the first data decrypted by the first decryption means and the second data, comprising copyright control information decrypted by said second decrypting means, for controlling outputting processing of said outputting means.

20. The data transmission system according to claim 19 wherein said transmission means and the reception means transmit and receive said audio visual data and said copyright control information for copyright control processing thereof, respectively.

21. The data transmission system according to claim 20 wherein the copyright control information is superimposed by watermark processing on said audio visual data;

copyright control information detection means being provided in the data processing apparatus for detecting the copyright control information from the second data decrypted by said second decrypting means, said control means controlling the output of data by said outputting means based on said copyright control information detected by said copyright control information detection means and based on said medium-type information decrypted by said first decrypting means.

22. A data transmission system comprising a data reproducing apparatus and a data processing apparatus, in which audio visual data reproduced from a recording medium by said data reproducing apparatus is transmitted to said data processing apparatus, the transmitted audio visual data is processed in a predetermined manner by said data processing apparatus, and in which the processed audio visual data is output, said data reproducing apparatus including reproducing means for reproducing first and second data recorded on a recording medium, encryption means for encrypting, in accordance with a first encryption processing, the first data comprising media-type information reproduced by said reproducing means and for encrypting the second data reproduced by said reproducing means in accordance with a superimposing processing, said second data comprising copyright control information relevant to at least copyright control processing of said audio visual data, transmission means for transmitting said first and second data encrypted by said encrypting means to an external signal processing device, reception means for receiving playback control data transmitted from said external signal processing device, said playback control data being said data transmitted by said transmission means, said transmitted data being processed with copyright control processing, decrypting means for performing decryption processing matched to the encryption of said playback control data received by said reception means, and control means for controlling the playback processing of said reproducing means based on said playback control data decrypted by said decrypting means;

said data processing device including reception means for receiving said first data comprising media-type information and said second data, comprising copyright control information relevant to at least copyright control processing of said audio visual data, said first data being encrypted in accordance with a first encryption process and the second data being superimposed on said audio visual data in accordance with watermark processing, said first and second data being transmitted in this encrypted form from an external device, decrypting means for performing matched decryption processing on said first and said second data received by said reception means, outputting means for outputting data decrypted by said decrypting means, control means for performing copyright control processing of said data output by said outputting means, based on at least the first data and the second data decrypted by said decrypting means, for generating transmission control data for controlling the transmission processing of said data transmitted from said external device, encrypting means for performing encryption processing on said transmission control data generated by said control means, said encryption processing being different from the encryption processing performed on the first and second data received by said reception means, and transmitting means for transmitting the transmission control data encrypted by said encrypting means to said external device.

23. The data transmission system according to claim 22 wherein said transmission means and the reception means transmit and receive said audio visual data and said copyright control information for copyright control processing thereof, respectively.

24. The data transmission system according to claim 23 wherein the copyright control information is superimposed by watermark processing on said audio visual data;

copyright control information detection means being provided in said data processing device for detecting the copyright control information from first and second data decrypted by said first decrypting means received via said reception means; and said control means performing copyright control processing of said data output by said outputting means, based on said copyright control information detected by said copyright control information detection means and based on said medium-type information decrypted by said decrypting means, to perform copyright control processing of said data output by said outputting means to control data transmitted from said data reproducing means.

25. The data transmission system according to claim 22 wherein in said data reproducing device, said encryption means includes first encrypting means for performing first encryption processing on said first data reproduced by said reproducing means and a second encrypting means for performing second encryption processing different from said first encryption processing on at least copyright control information of said reproduced data relevant to copyright control processing; and wherein in said data processing device, said decrypting means includes first decrypting means for performing first decryption processing, matched to said first encryption processing, on said data received by said reception means, and second decrypting means for performing second decryption processing, matched to said second encryption processing, on said data received by said reception means, said encrypting means performing encryption processing different from both the first decryption processing and the second decryption processing on the transmission control data.

26. The data transmission system according to claim 25 wherein said transmission means and said reception means transmit and receive said audio visual data and said copyright control information for copyright control processing thereof, respectively.

27. The data transmission system according to claim 26 wherein the copyright control information is superimposed by watermark processing on said audio visual data; and copyright control information detection means being provided in said data reproducing device for detecting the copyright control information from the audio visual data decrypted by said second decrypting means, said control means performing output control processing of said data output by said outputting means, based on said copyright control information detected by said copyright control information detection means and based on said medium-type information decrypted by said first decrypting means to generate transmission control data controlling data transmitted from said data reproducing means.

28. A data reproducing method for reproducing audio visual data comprising the steps of:

reproducing first and second data recorded on a recording medium;

performing first encryption processing on the first data reproduced, said first data comprising medium-type information;

performing second encryption processing, different from said first encryption processing, on said second data, said second data comprising copyright control information, and said second encryption processing comprising watermark processing to superimpose said second data on said audio visual data; and transmitting the encrypted data and encrypted control data;

wherein said copyright control information and said medium-type information are used to control copyright control processing.

29. The data reproducing method according to claim 28 wherein
said audio visual data is reproduced from said recording medium.

30. The data reproducing apparatus according to claim 29 wherein
the copyright control information is superimposed by watermark processing on said audio visual data after being reproduced as part of said audio visual data.

31. A data reproducing method for reproducing audio visual data comprising the steps of:
reproducing first and second data recorded on a recording medium;
encrypting the reproduced first data comprising medium-type information in accordance with a first encryption processing for encrypting the reproduced second data, comprising copyright and control information relevant to at least the copyright control processing of said audio visual data in accordance with a superimposing watermark process;
transmitting the encrypted first and second data to an external signal processing device;
receiving playback control data transmitted from said external signal processing device, said playback control data comprising the data transmitted to said external signal processing device following copyright control processing and subsequent encryption processing different from the prior encryption processing performed on said control data;
performing decryption processing on the received playback control data matched to the encryption processing for the received playback control data; and
controlling the playback processing based on the decrypted playback control data.

32. The data reproducing method according to claim 31 wherein
said audio visual data is reproduced from said recording medium.

33. The data reproducing apparatus according to claim 32 wherein
the copyright control information is superimposed by watermark processing on said audio visual data after being reproduced as part of said audio visual data.

34. A data reproducing method for reproducing audio visual data comprising the steps of:
reproducing first and second data from a storage device;
performing first encryption processing on the reproduced first data comprising medium-type information;
performing second encryption processing, different from said first encryption processing, on the reproduced second data, comprising copyright control information relevant to copyright control processing of the reproduced audio visual data; and
receiving playback control data subjected to encryption processing different from both the first encryption processing and the second encryption processing.

35. The data reproducing method according to claim 34 wherein
said audio visual data is reproduced from said recording medium.

36. The data reproducing apparatus according to claim 35 wherein
the copyright control information is superimposed by watermark processing on said audio visual data after being reproduced as part of said audio visual data.

37. A data processing method for reproducing audio visual data comprising the steps of:
receiving first data subjected to first encryption processing and second data superimposed on said audio visual data in accordance with watermark processing different from said first encryption processing, comprising copyright control information at least relevant to copyright control processing of said audio visual data, said first and second data being transmitted from an external device;
performing first decryption processing matched to said first encryption processing on the received first data, said first data comprising medium-type information;
performing second decryption processing matched to said watermark processing on the received second data;
performing at least copyright control processing of said audio visual data based on said first and second data; and
outputting the audio visual data in accordance with said copyright control processing.

38. The data processing method according to claim 37 wherein said audio visual data and the first and second data relevant to copyright control processing thereof are received together.

39. The data processing method according to claim 38 wherein
the copyright control information is superimposed by watermark processing on said audio visual data;
the copyright control information is detected from the second data decrypted in accordance with said second decryption processing; and
said audio visual data is outputting-controlled based on the detected copyright control information and on the decrypted medium-type information.

40. A data processing method for reproducing audio visual data comprising the steps of:
receiving first data comprising medium-type information and second data, comprising copyright control information at least relevant to copyright control processing of said audio visual data, said first data being encrypted in accordance with a first encryption processing and the second data being superimposed on said audio visual data in accordance with watermark processing, said first and second data being transmitted in this encrypted form from an external device;
performing matched decryption processing on the received first data and second data;
outputting the decrypted data;
performing copyright control processing on said output data, based at least in part on the decrypted first and second data, to generate transmission control data for controlling transmission of data from said external device;
performing encryption processing, different from that performed on the first and second data, on the generated transmission control data; and
transmitting the encrypted transmission control data to said external device.

41. The data processing method according to claim 40 wherein
said audio visual data and the first and second data relevant to copyright control processing are received together.

42. The data processing method according to claim 41 wherein the copyright control information is superimposed by watermark processing on said audio visual data;

the copyright control information is detected from the decrypted first and second data; and wherein copyright control processing is performed on the output data based on the detected copyright control information and based on said medium-type information.

43. The data processing method according to claim 40, further comprising the steps of:

receiving said first data subjected to first encryption processing and said second data, comprising copyright control information relevant to at least copyright control processing of said audio visual data and which is superimposed in accordance with watermark processing, said first data and said second data being transmitted from an external device;

subjecting the received first data to first decryption processing matched to said first encryption processing;

subjecting the received second data to second decryption processing matched to said watermark processing; and subjecting the transmitted control data to encryption processing different from both the first encryption processing and the watermark processing.

44. The data processing method according to claim 43, further comprising the step of:

receiving said audio visual data and said copyright control information relevant to copyright control processing together.

45. The data processing method according to claim 44 wherein the copyright control information is superimposed by watermark processing on said audio video data;

the copyright control information is detected from the decrypted audio visual data, and wherein copyright control processing of said outputted data is performed based on the detected copyright control information and the decrypted medium-type information.

46. A data transmission method in which a transmitting side transmits audio visual data reproduced from a recording medium via a transmission medium and in which a reception side performs pre-set processing on transmitted audio visual data to output the processed audio visual data, wherein the transmitting side reproduces first and second data recorded on the recording medium, said first data comprising medium-type information, processes the reproduced first data with first encryption, processes the reproduced second data with second encryption different from said first encryption, said second data comprising copyright control information, and said second encryption processing comprising watermark processing to superimpose said second data on said audio visual data, and transmits the encrypted first and second data over a transmission medium;

the reception side receives the transmitted first data and second data superimposed on said audio visual data, performs first decryption processing matched to said first encryption processing on the received first data, performs second decryption processing matched to said second encryption processing on the received second data, the decrypted first and second data being output, and copyright control processing for the output data being performed based on at least the copyright control information subjected to said second decryption processing.

47. The data transmission method according to claim 46 further comprising the step of:

transmitting said audio visual data and said copyright control information relevant to copyright control processing together.

48. The data transmission method according to claim 47 wherein the copyright control information is superimposed by watermark processing on said audio visual data; and wherein the reception side detects the copyright control information from decrypted second data and performs output control of said audio visual data based on the detected copyright control information and the decrypted medium-type information.

49. A data transmission method in which a transmitting side transmits audio visual data reproduced from a recording medium via a transmission medium and in which a reception side performs pre-set processing on transmitted audio visual data to output the processed audio visual data, wherein the transmitting side reproduces first and second data recorded on the recording medium, processes the reproduced first data in accordance with a first encryption processing, said first data comprising medium-type information and processing the reproduced second data in accordance with a superimposing process, said second data comprising copyright and control information relevant to at least copyright control processing of said audio visual data, transmits the encrypted first and second data over a transmission medium to the reception side, receives encrypted playback control data, performs decryption processing matched to encryption processing of the received playback control data, and controls playback processing based on the decrypted playback control data; and wherein the reception side receives the transmitted first and second data, performs matched decryption processing on the received first and second data, outputs the decrypted data, performs copyright control processing of said output data based on at least the decrypted first and second data, generates transmission control data for controlling the transmission of data from the transmitting side, performs decryption processing on the generated transmission control data different from that performed on the received first and second data, and transmits the encrypted transmission control data to the transmitting side.

50. The data transmission method according to claim 49 further comprising the step of:

transmitting said audio visual data and said first and second data together.

51. The data transmission method according to claim 50 wherein the copyright control information is superimposed by watermark processing on said audio visual data; and wherein the reception side detects the copyright control information from the decrypted first and second data and performs copyright control processing of the output data based on at least the detected copyright control information and the decrypted medium-type information to generate transmission control data for controlling transmission of data from the transmitting side.

52. The data transmitting method according to claim 49 wherein the transmitting side performs first encryption processing on the reproduced first data, performs second encryption processing different from the first encryption processing on the reproduced second data, and receives the encrypted playback control data from the receiving side; and wherein the reception side receives the transmitted first and second data and the control data, performs first decryption processing matched to the first encryption processing on said first data and second decryption processing matched to the second encryption processing on the received second data, and decryption on the received playback control data corresponding to the encryption processing thereof, respectively, and performs encryption processing different from both the first encryption processing and the second encryption processing on the transmission control data.

53. The data transmitting method according to claim 52 further comprising the steps of:

reproducing said audio visual data and said first and second data together.

54. The data transmitting method according to claim 53 wherein the copyright control information is superimposed by watermark processing on said audio visual data; and wherein the reception side detects the copyright control information from decrypted first and second data and performs copyright control processing of the output data based on at least the detected copyright control information and the decrypted medium-type information to generate transmission control data for controlling transmission of data from the transmitting side.

\* \* \* \* \*